(12) United States Patent
Simard et al.

(10) Patent No.: US 10,053,024 B2
(45) Date of Patent: Aug. 21, 2018

(54) FLOOR RECESSES FOR A CARGO BOX

(71) Applicant: BOMBARDIER RECREATIONAL PRODUCTS INC., Valcourt (CA)

(72) Inventors: Mikhael Simard, St-Honore (CA); Frederic Martineau, Valcourt (CA); Maxime Dumont, Verdun (CA); Tom Aube, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 53 days.

(21) Appl. No.: 15/267,194

(22) Filed: Sep. 16, 2016

(65) Prior Publication Data

US 2017/0029042 A1 Feb. 2, 2017

Related U.S. Application Data

(63) Continuation-in-part of application No. PCT/IB2015/057218, filed on Sep. 18, 2015.

(60) Provisional application No. 62/198,874, filed on Jul. 30, 2015, provisional application No. 62/301,227, filed on Feb. 29, 2016.

(51) Int. Cl.
| | |
|---|---|
| *B62D 63/02* | (2006.01) |
| *B60R 11/06* | (2006.01) |
| *B60P 3/00* | (2006.01) |
| *B60R 7/06* | (2006.01) |
| *B60P 3/42* | (2006.01) |
| *B60P 7/08* | (2006.01) |
| *B60P 7/135* | (2006.01) |
| *B60R 11/00* | (2006.01) |

(52) U.S. Cl.
CPC ............. *B60R 11/06* (2013.01); *B60P 3/00* (2013.01); *B60P 3/42* (2013.01); *B60P 7/0884* (2013.01); *B60P 7/135* (2013.01); *B60R 7/06* (2013.01); *B60R 2011/0005* (2013.01)

(58) Field of Classification Search
CPC ..... B60R 11/06; B60R 7/06; B60R 2011/005; B60P 3/00; B60P 3/42; B60P 7/0084; B60P 7/135; B60P 7/06
See application file for complete search history.

(56) References Cited

U.S. PATENT DOCUMENTS

| | | | |
|---|---|---|---|
| 4,958,876 A | | 9/1990 | Diaco et al. |
| 5,044,682 A | * | 9/1991 | Wayne ............... B60P 7/14 296/39.2 |

(Continued)

*Primary Examiner* — Lori Lynn Lyjak
(74) *Attorney, Agent, or Firm* — BCF LLP

(57) ABSTRACT

A vehicle having a cargo box is disclosed. The vehicle comprises a frame, at least one seat connected to the frame, a motor connected to the frame, a plurality of ground engaging members, and a cargo box connected to the frame. The cargo box comprises a floor comprising at least one recessed region, a front wall defining a first vertical notch, a first side wall defining a second vertical notch, a second side wall defining a third vertical notch, the second and third vertical notches being rearward of the recessed region, a first accessory wall being selectively received in the first vertical notch and a second accessory wall being selectively received in the second and third vertical notches, the at least one recessed region being disposed between the first accessory wall and one of the first and second side walls and between the front wall and the second accessory wall.

19 Claims, 14 Drawing Sheets

(56) References Cited

U.S. PATENT DOCUMENTS 5,301,997 A * 4/1994 Cudden ................... B60P 3/42
                                                29/401.1
6,022,062 A * 2/2000 Fleenor ................ B60P 7/0892
                                                296/186.1

* cited by examiner

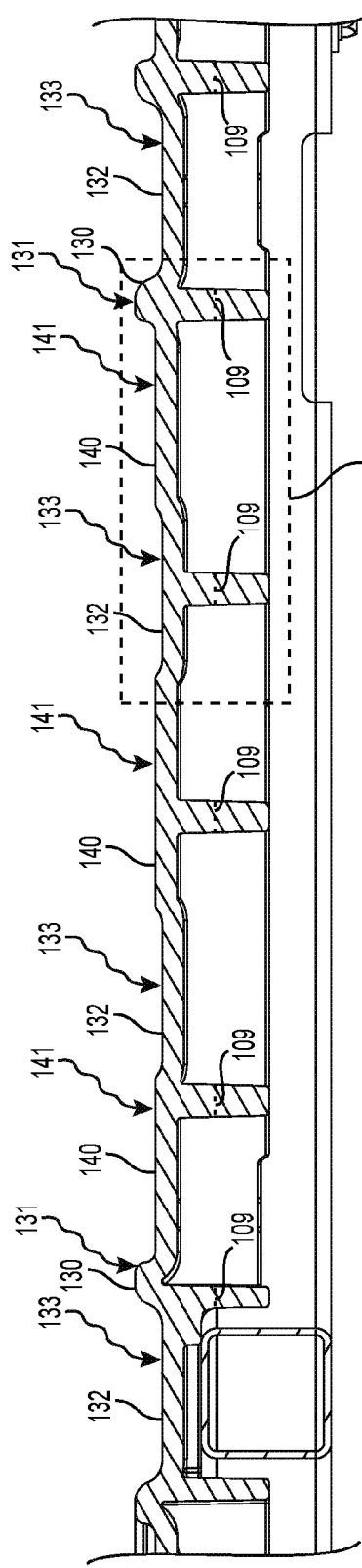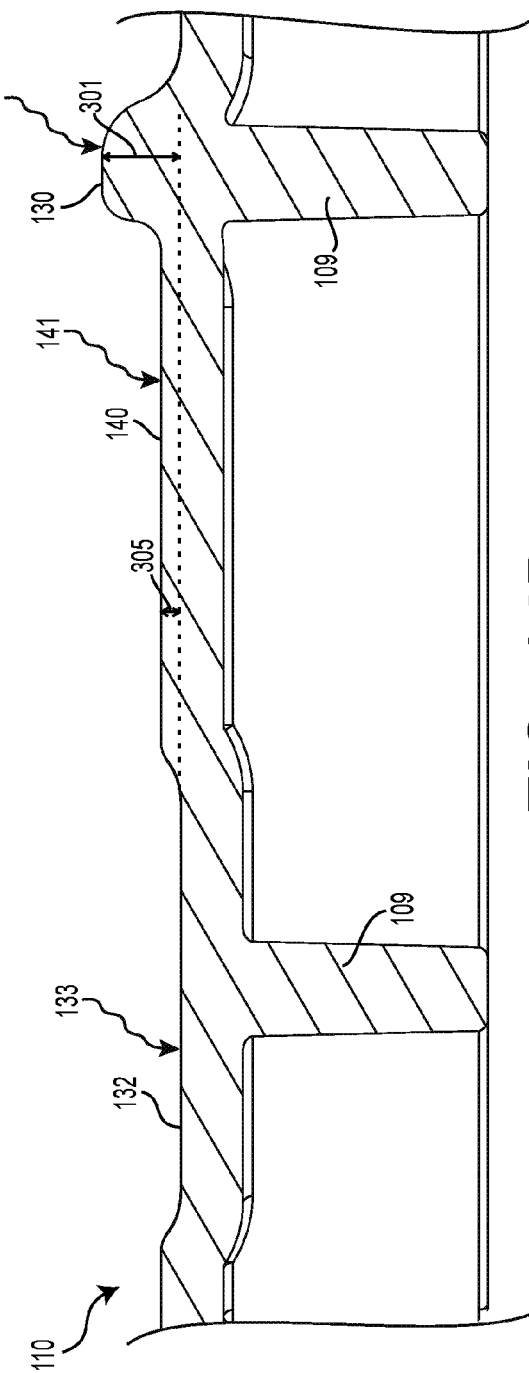

FLOOR RECESSES FOR A CARGO BOX

CROSS-REFERENCE

The present application claims priority to U.S. Provisional Patent Application No. 62/301,227, filed Feb. 29, 2016, entitled "Floor Recesses for a Cargo Box" and is a Continuation-in-Part of International PCT Patent Application No. PCT/IB2015/057218, filed Sep. 18, 2015 which claims priority to U.S. Provisional Patent Application No. 62/198,874, filed Jul. 30, 2015, the entirety of all of which is incorporated herein by reference.

TECHNICAL FIELD

The present technology relates to a cargo box for a vehicle and a vehicle incorporating a cargo box.

BACKGROUND

Side-by-side vehicles (SSVs) are off-road vehicles that are often used for transporting a large variety of different items, from sporting equipment to construction materials, in a cargo box. Some items, such as buckets, may slide or tip in the cargo box during operation. Additionally, liquids may be found on the floor of the cargo box, either from weather conditions or overturned containers, while a user of the vehicle may wish to keep the items being transported in the cargo box from having too much contact with the liquids.

As such, it is desirable to have a cargo box configured for conveniently transporting a wide variety of items in an SSV or similar vehicle.

SUMMARY

It is an object of the present to ameliorate at least some of the inconveniences present in the prior art.

According to one aspect of the present technology, there is provided a vehicle. The vehicle comprises a frame, at least one seat connected to the frame, a motor connected to the frame, a plurality of ground engaging members, and a cargo box connected to the frame rearward of the at least one seat. The cargo box comprises a floor comprising at least one recessed region, a front wall extending upward from the floor, the front wall defining a first vertical notch, a first side wall extending upward from a first side of the floor, the first side wall defining a second vertical notch, a second side wall extending upward from a second side of the floor, the second wall being disposed opposite to the first side wall, the second side wall defining a third vertical notch opposite the second vertical notch, the second and third vertical notches being disposed rearward of the at least one recessed region, a first accessory wall being selectively received in the first vertical notch and a second accessory wall being selectively received in the second and third vertical notches, the at least one recessed region being disposed between the first accessory wall and at least one of the first and second side walls, when the first accessory wall is received in the first vertical notch, and between the front wall and the second accessory wall, when the second accessory wall is received in the second and third vertical notches.

In some implementations, the floor further comprises a plurality of channels, each channel having a channel surface and a plurality of ribs disposed between the plurality of channels, each rib having a rib surface at a first height above the channel surfaces, at least two adjacent ribs each defining a rib recess, each rib recess having a recess surface at a second height above the channel surfaces, the second height being less the first height, the rib recess surfaces being generally aligned such that an item can be received thereon, the rib recesses of the at least two adjacent ribs forming the at least one recessed region.

In some implementations, the cargo box comprises a floor, a front wall extending upward from the floor, a first side wall extending upward from a first side of the floor, and a second side wall extending upward from a second side of the floor, the second wall being disposed opposite to the first side wall, the floor comprising at least one recessed region.

In some implementations, the floor of the cargo box further comprises a plurality of ribs, each rib having a rib surface at a first height, and a plurality of channels disposed between the plurality of ribs, each channel having a channel surface at a second height, the second height being lower than the first height, at least two adjacent ribs each defining a rib recess, each rib recess having a recess surface at a third height, the third height being intermediate the first height and the second height, the rib recess surfaces being generally aligned such that an item can be received thereon, the rib recesses of the at least two adjacent ribs forming the at least one recessed region.

In some implementations, the at least one recessed region is generally circular.

In some implementations, the at least one recessed region is four recessed regions disposed between the first side wall and the second side wall.

In some implementations, the vehicle further comprises at least one wall recess defined by the front wall, the at least one wall recess having a wall recess surface at the third height, the wall recess surface also defining the recessed region.

In some implementations, the rib recesses are first rib recesses having first recess surfaces, the at least one recessed region is a first recessed region, and an other at least two adjacent ribs define second rib recesses, each second rib recess having a second recess surface at the third height, the second rib recess surfaces being generally aligned such that an other item can be received thereon, the second rib recesses defining a second recessed region.

In some implementations, the floor further comprises at least one pair of hooks aligned with the at least one recessed region and disposed on either side thereof.

In some implementations, the first side wall defines a first horizontal notch, the second side wall defines a second horizontal notch disposed opposite the first horizontal notch, and an accessory bar is selectively received in the first and second horizontal notch.

In some implementations, the first side wall defines a first plurality of horizontal notches, the second side wall defines a second plurality of horizontal notches disposed opposite the first plurality of horizontal notches, and a plurality of accessor bars are selectively received in the first and second plurality of horizontal notches.

In some implementations, at least one of the front, first side, and second side walls further defines at least one support slot and an accessory bar is selectively received in the at least one support slot.

In some implementations, the first side wall defines a first vertical notch, the second side wall defines a second vertical notch opposite the first vertical notch, and an accessory wall is selectively received in the first and second vertical notches.

In some implementations, the first and second vertical notches are disposed rearward of the at least one recessed region and when the accessory wall is received in the first and second vertical notches, the recessed region is between the front wall and the accessory wall.

In some implementations, the accessory wall has a top edge at a first height, at least one of the front, first side, and second side wall has a top edge at a second height, and the first height is greater than half of the second height.

In some implementations, the accessory wall is a first accessory wall, the front wall defines a third vertical notch, and when a second accessory wall is received in the third vertical notch, the recessed region is between the front wall and the first accessory wall and the second accessory wall and at least one of the first and second side walls.

In some implementations, the front wall defines a first vertical notch, the tailgate defines a second vertical notch opposite the first vertical notch, and an accessory wall is selectively received in the first and second vertical notches.

In some implementations, the at least one recessed region is a first recessed region and a second recessed region and when the accessory wall is received in the first and second vertical notches, the accessory wall is laterally between the first recessed region and the second recessed region.

In some implementations, the floor further comprises a third recessed region, the front wall further defines a fifth vertical notch, the tailgate further defines a sixth vertical notch, and when a third accessory wall is selectively received in the fifth and sixth vertical notches, the third accessory wall is laterally between the second recessed region and the third recessed region.

In some implementations, the cargo box is pivotably mounted to the frame.

For the purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction.

Should there be any difference in the definitions of term in this application and the definition of these terms in any document included herein by reference, the terms as defined in the present application take precedence.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 14A is a close-up of the portion FIG. 14A of FIG. 13; and

FIG. 14B is a close-up of the portion FIG. 14B of FIG. 14A.

DETAILED DESCRIPTION

The present technology will be described herein with respect to a side-by-side vehicle (SSV) designed to accommodate three riders (one driver and two passengers) seated side-by-side in an open cockpit area. However, it is contemplated that at least some aspects of the present technology could be adapted for use on other kinds of vehicles such as, but not limited to, SSVs designed to accommodate less or more than three passengers and all-terrain vehicles (ATVs).

Figure 1:
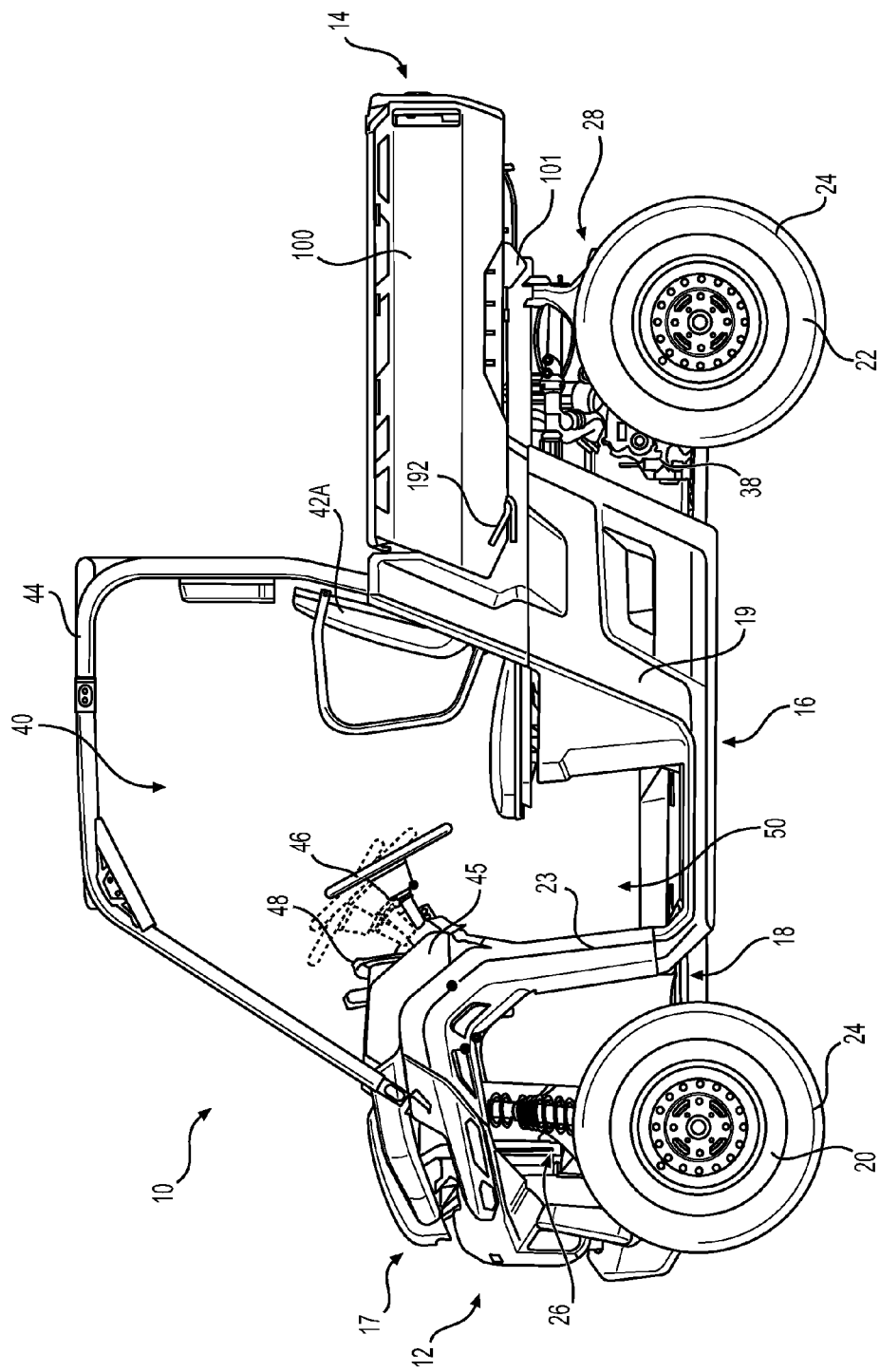
FIG. 1 is a left side elevation view of a side-by-side vehicle.
Figure 2:
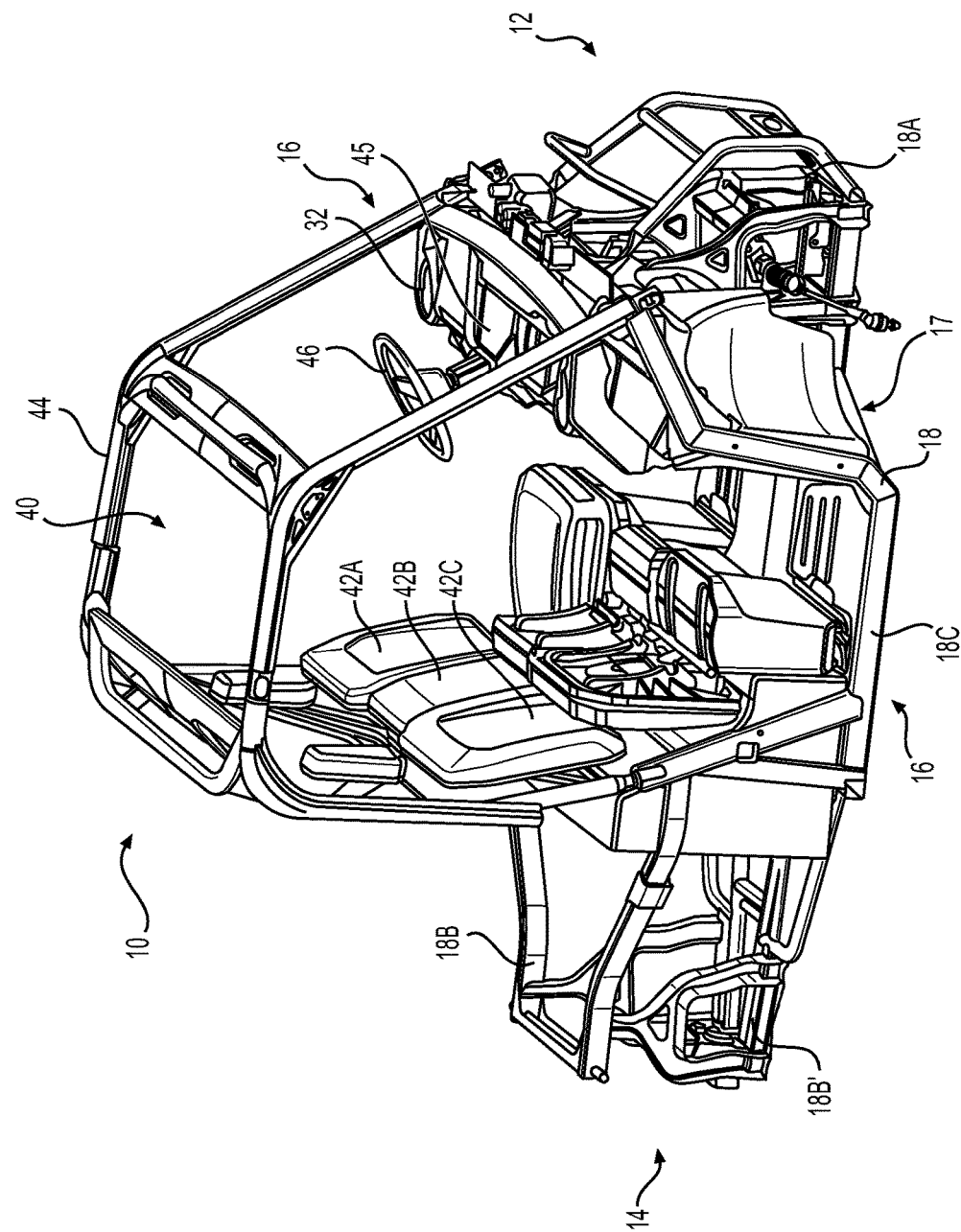
FIG. 2 is a front, right side perspective view of a portion of the vehicle of FIG. 1 showing part of the vehicle body and the cockpit area.

FIGS. 1 and 2 illustrate a vehicle 10 having a front end 12, a rear end 14, and left and right sides 16, defined consistently with the forward travel direction of the vehicle 10. The vehicle 10 includes a vehicle body 17, to which the other parts of the vehicle 10 are connected. The vehicle body 17 includes a frame 18 and a plurality of body panels 19. The frame 18 has a front portion 18A, a rear portion 18B and a middle portion 18C.

The vehicle 10 includes a pair of front wheels 20 and a pair of rear wheels 22 (only the left wheels 20, 22 being shown). Each of the wheels 20, 22 has a tire 24. Each front wheel 20 is suspended from the front portion 18A of the frame 18 via a front suspension assembly 26. Each rear wheel 22 is suspended from the rear portion 18B of the frame 18 via a rear suspension assembly 28.

The vehicle 10 has an open-air cockpit area 40 disposed generally in the middle portion of the vehicle 10. The cockpit area 40 is defined at its front by at least a front wall 23. The cockpit area 40 has a left seat 42A to accommodate a driver of the vehicle 10, and a middle seat 42B and a right seat 42C to accommodate two passengers (collectively referred to herein as riders). It is contemplated that the vehicle 10 could have only the left seat 42A and the right seat 42C. As the left seat 42A, the middle seat 42B and the right seat 42C are distributed laterally, the vehicle 10 is referred to as a side-by-side vehicle, or SSV. It is contemplated that the vehicle 10 could have one or more additional rows of seats. The seat bottoms of the middle seat 42B and the right seat 42C can be tilted up to provide access to storage disposed under these seats, as shown in FIG. 2. It is contemplated that the seat bottoms of one or more of these seats could be fixed. The seat bottom of the left seat 42A is fixed, but it is contemplated that it could also be tilted up. A roll cage 44, connected to the frame 18, is disposed over the cockpit area 40.

A steering assembly, including a steering wheel 46, is disposed in front of the left seat 42A. The steering assembly is operatively connected to the two front wheels 20 to permit steering of the vehicle 10. As can be seen from the dotted lines in FIG. 1, the position of the steering wheel 46 can be adjusted. It is contemplated that the steering wheel 46 could have only a single fixed position. A dashboard 45 is attached to an upper portion of a front wall 23. A display cluster 48 is mounted to the dashboard 45, forward of the steering wheel 46. The display cluster 48 includes a number of screens and dials for the operation of the vehicle, such as a speedometer, odometer, engine speed indicator, fuel gauge, an engine temperature gauge, and the like.

The cockpit area 40 has openings 50 on the left and right sides 16 of the vehicle 10 through which the riders can enter and exit the vehicle 10. It is contemplated that a lateral cover and/or a door could be selectively disposed across each opening 50. The lateral covers/doors would be disposed across the openings 50 when the riders are riding the vehicle 10 and could be opened by the driver and/or passenger when they desire to enter or exit the cockpit area 40.

Figure 6:
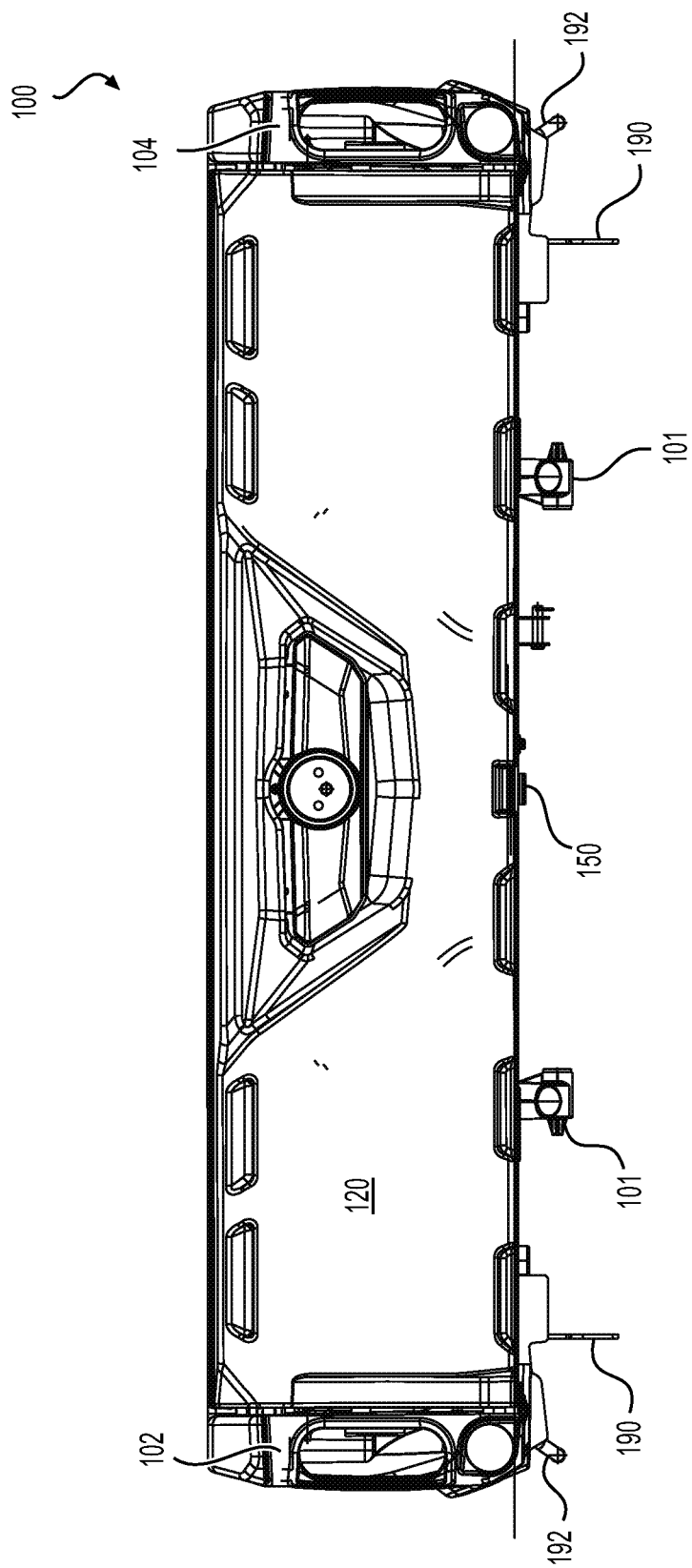
FIG. 6 is a rear elevation view of the cargo box of FIG. 4.
Figure 7:
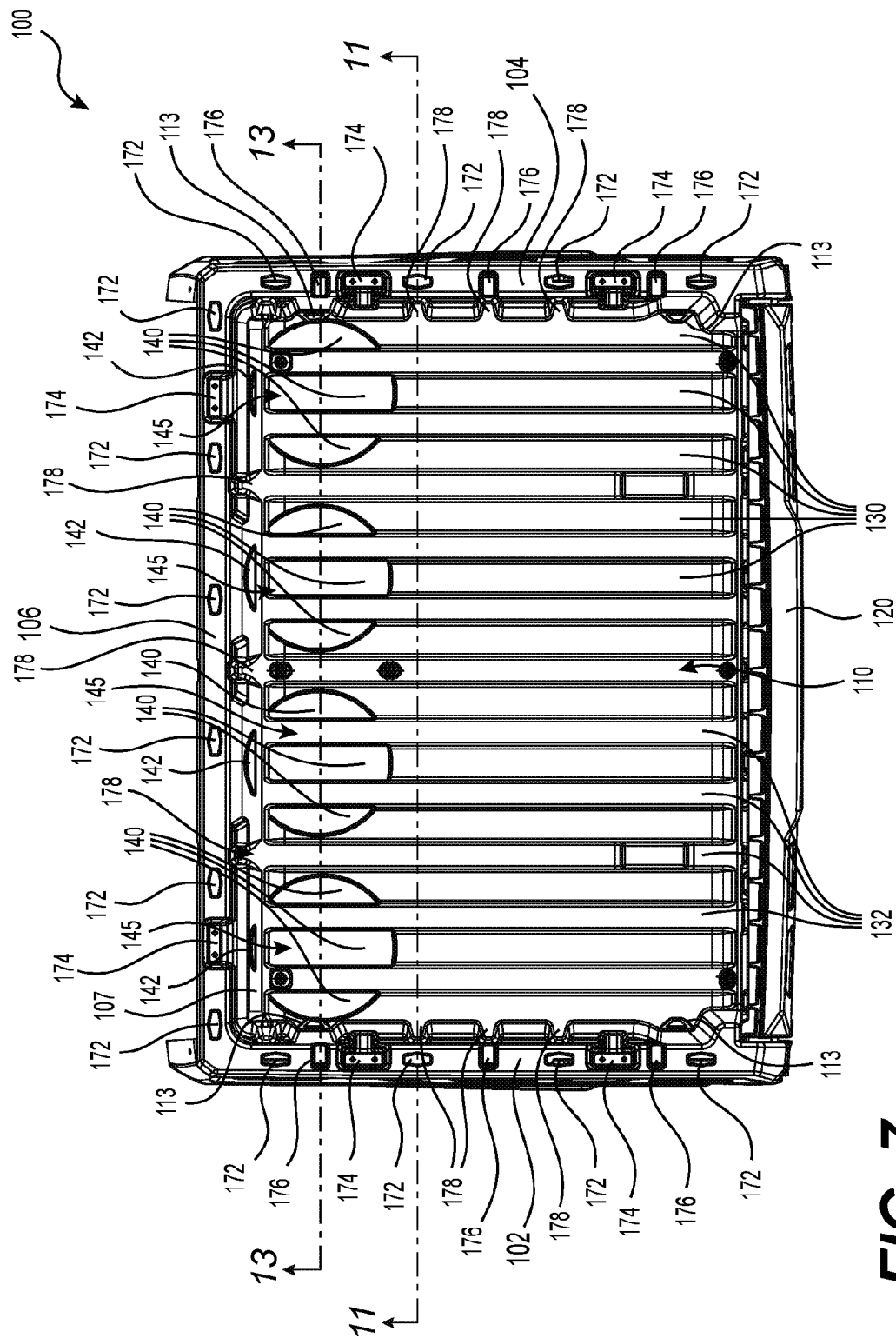
FIG. 7 is a top plan view of the cargo box of FIG. 4.

A cargo box 100 is pivotally connected to the rear portion 18B of the frame 18 rearward of the seats. The cargo box 100 is generally rectangular and opened at the top. It is contemplated that the cargo box 100 could have a top cover, and could have a different shape than that shown herein. The front end of the cargo box 100 is secured to the rear portion 18B of the frame 18 by latches 190 (see FIG. 6) connected between the cargo box 100 and the frame 18. The rear end of the cargo box 100 extends rearward of the rear portion 18B of the frame 18 and of the rear wheels 22. The cargo box 100 has a pair of brackets 101 (only the left bracket 101 being shown in FIG. 1) extending downwards from its lower surface. The brackets 101 pivotally connect the cargo box 100 to the rear portion 18B of the frame 18 such that the front end of the cargo box 100 can be pivoted upwards to access the engine 38 and other internal components of the vehicle 10 located thereunder, or to unload the contents of the cargo box 100. The two latches 190 secure the cargo box 100 in a generally horizontal position during standard operation. To tilt the cargo box 100 with respect to the frame 18, a lever 192 connected to each of the latches 190 is rotated by the user, causing the latches 190 to release the cargo box 100 from the frame 18. It is also contemplated that the cargo box 100 could be pivotably mounted to the frame 18 using a different mechanism.

The powertrain of the vehicle 10 and components associated with the powertrain will now be described with reference to FIGS. 1, 2 and 3. The engine 38 is mounted to a lower portion 18B' of the rear portion 18B of the frame 18. As will be described in more detail below, the engine 38 drives the front and rear wheels 20, 22. It is contemplate that the engine 38 could selectively switch between driving two and four of the wheels 20, 22. It is also contemplated that the engine 38 could drive only the front wheels 20 or only the rear wheels 22.

The engine 38 of the present embodiment is a four-stroke V-twin engine. Accordingly, as can be seen in FIG. 3, the engine 38 has two cylinders 56 extending at an angle from each other. The engine 38 has an output shaft (not shown) extending horizontally and laterally. It is contemplated that other types of motors could be used. For example, it is contemplated that the motor could be an engine with in-line cylinders 56 or that the motor could be an electric motor. The engine 38 receives fuel from a fuel tank (not shown). The engine 38 receives air via an air induction system (not shown). The air induction system includes an intake manifold connected to the two cylinders 56, a throttle body connected upstream of the intake manifold, an air box connected upstream of the throttle body, and a number of air intake conduits extending between these components. An exhaust system (not shown) delivers exhaust gases from the engine 38 to the atmosphere. The exhaust system includes exhaust conduits, an exhaust manifold, and a muffler.

Figure 3:
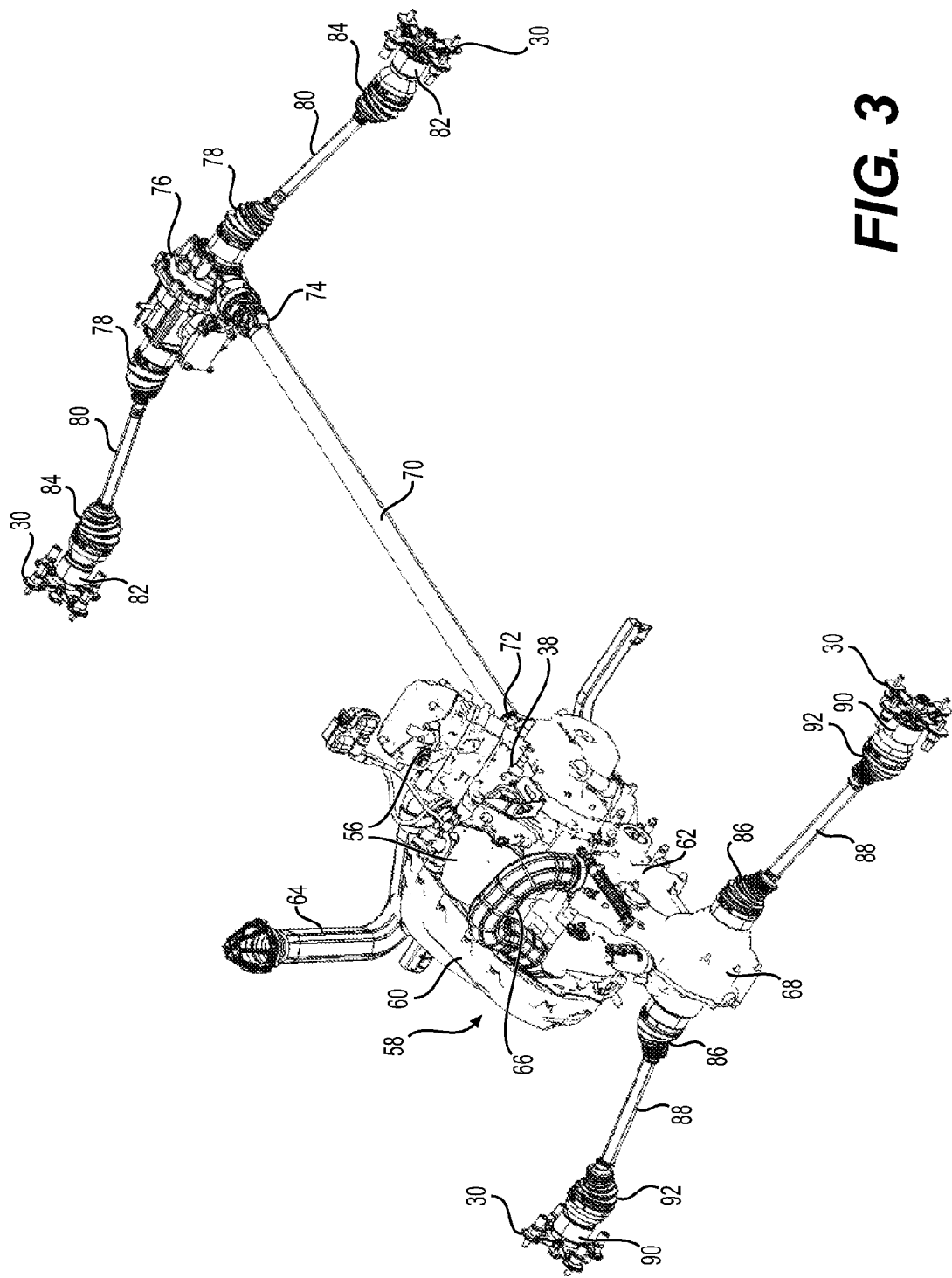
FIG. 3 is a rear, right perspective view of a powertrain of the vehicle of FIG. 1.
Figure 4:
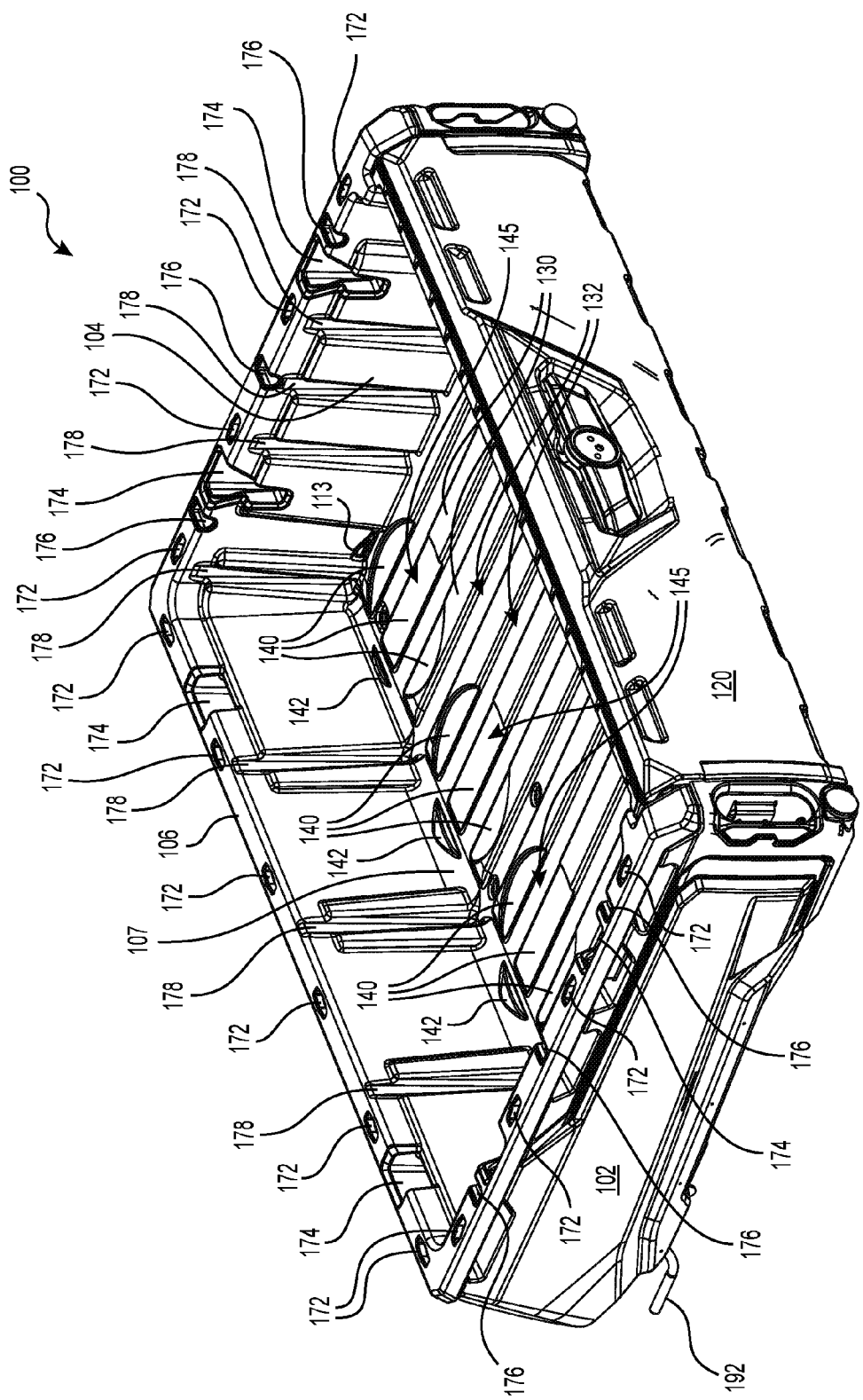
FIG. 4 is a rear, left side perspective view of a cargo box of the vehicle of FIG. 1.

As can be seen in FIG. 3, a continuously variable transmission (CVT) 58 is disposed on a left side of the engine 38. The CVT 58 has a primary pulley, a secondary pulley and a belt (all not shown) looped around the primary and secondary pulleys to transmit torque therebetween. The primary pulley, the secondary pulley and the belt are disposed inside a cover 60. The primary pulley is mounted on the output shaft of the engine 38 so as to rotate therewith. It is contemplated that the primary pulley could be connected to another shaft that is driven by the output shaft. The secondary pulley is mounted on an input shaft of a transmission 62 so as to drive the input shaft and therefore the transmission 62. The transmission 62 is connected to the rear portion of the engine 38. An air intake conduit 64 is connected to the front portion of the CVT 58 for drawing cool air inside the cover 60 of the CVT 58 for cooling the CVT 58. The heated air inside the cover 60 of the CVT 58 is released to the atmosphere by a conduit 66 connected to the rear portion of the CVT 58.

The transmission 62 transfers the torque from the CVT 38 to a front driveshaft (not shown) and a rear differential 68. The front driveshaft passes through a casing of the engine 38 and connects to another front driveshaft 70 via a universal joint 72. The front end of the front driveshaft 70 connects to another universal joint 74. The universal joint 74 connects the front driveshaft 70 to a front differential 76. The front differential 76 is connected, via left and right constant velocity joints (not shown) enclosed in flexible boots 78, to left and right front drive axles 80. The front drive axles 80 are connected to spindles 82 of the front wheels 20 via constant velocity joints enclosed in flexible boots 84. The rear differential 68 is connected, via left and right constant velocity joints (not shown) enclosed in flexible boots 86, to left and right rear drive axles 88. The rear drive axles 88 are connected to spindles 90 of the rear wheels 22 via constant velocity joints enclosed in flexible boots 92.

Additional details of side-by-side vehicles similar to the vehicle 10 can be found in International Patent Publication No. WO 2015/114604, published Aug. 6, 2015, the entirety of which is incorporated herein by reference.

The cargo box 100 will now be described in more detail with respect to FIGS. 4 to 7. The cargo box 100 includes a front wall 106 and a floor 110. A left side wall 102 extends generally upward from a left side of the floor 110 and a right side wall 104 extends generally upward from a right side of the floor 110. The floor 110 includes a repeating series of ribs 130 and channels 132, which will be described in more detail below.

The cargo box 100 further includes a tailgate 120. The tailgate 120 is pivotally connected to the left and right side walls 102, 104. The tailgate 120 pivots about a pin (not shown) in a left side of the tailgate 120 and a pin (not shown) in a right side of the tailgate 120. Each of the pins is received in a slot 149 in each of the left and right side walls 102, 104. The tailgate 120 is removable from the side walls 102, 104, as the user can remove the pins from the slots 149. It is contemplated that in some implementations that tailgate 120 could be fixed in the side walls 102, 104. It is further contemplated that the tailgate 120 could be removably and pivotally connected to the floor 110 instead of the walls 102, 104 in some implementations. It is further contemplated that the tailgate 120 could be pivotable and not removable. It is contemplated that in some implementations the tailgate 120 could not be removable from the side walls 102, 104. It is further contemplated that the tailgate 120 could be connected to the floor 110 instead of the walls 102, 104 in some implementations.

Figure 5:
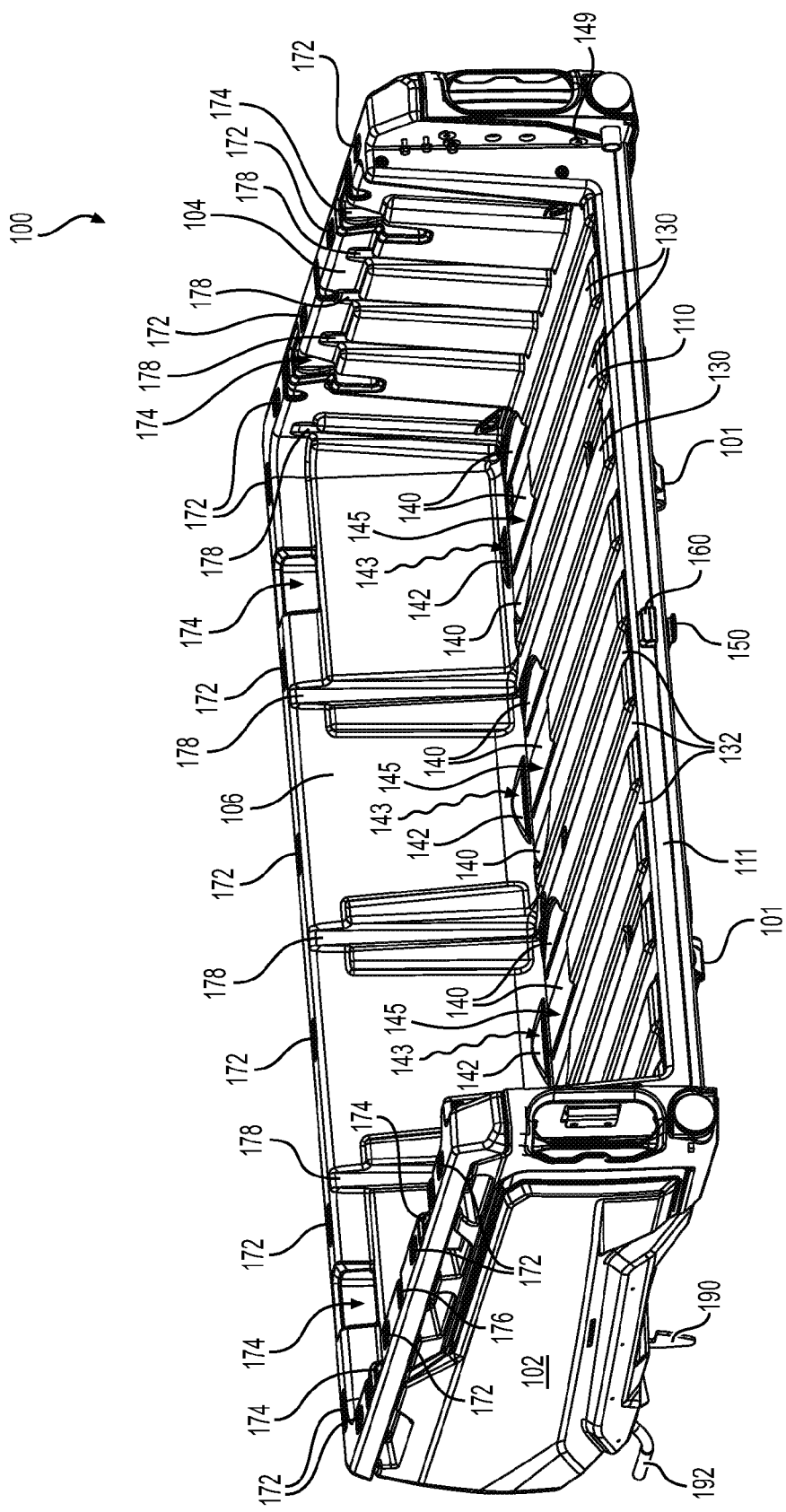
FIG. 5 is an other rear, left perspective view of the cargo box in FIG. 4, with a tailgate of the cargo box removed.

As can be seen in FIG. 5, the cargo box 100 also includes a tailgate support 150 and a protrusion 160 adapted for selectively abutting the tailgate 120 when the tailgate 120 flexes under applied loads. It is contemplated that the tailgate support 150, the protrusion 160, or both could be omitted in some implementations.

Figure 8:
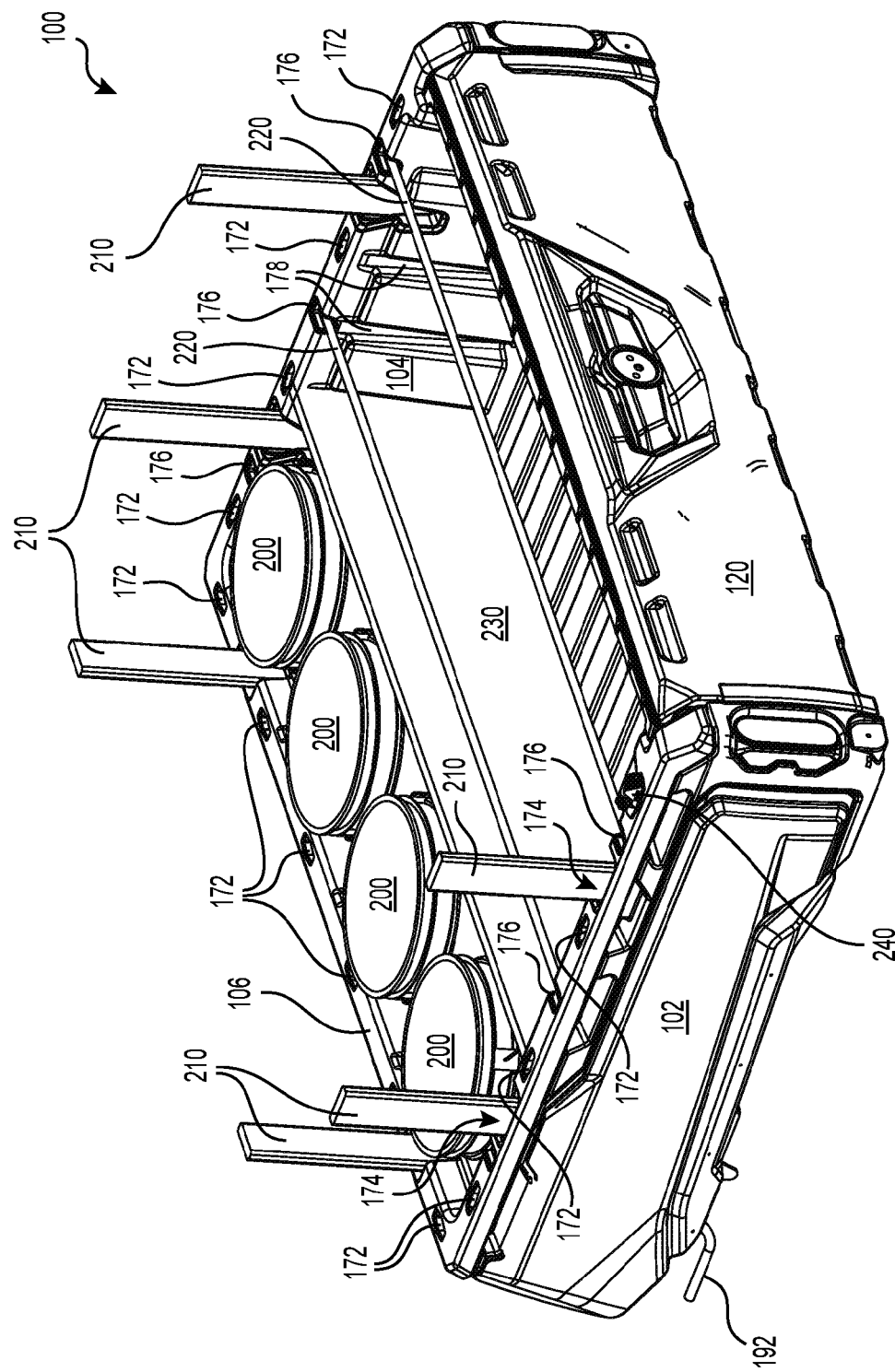
FIG. 8 is a rear, left side perspective view of the cargo box of FIG. 4, with accessories received therein.
Figure 9:
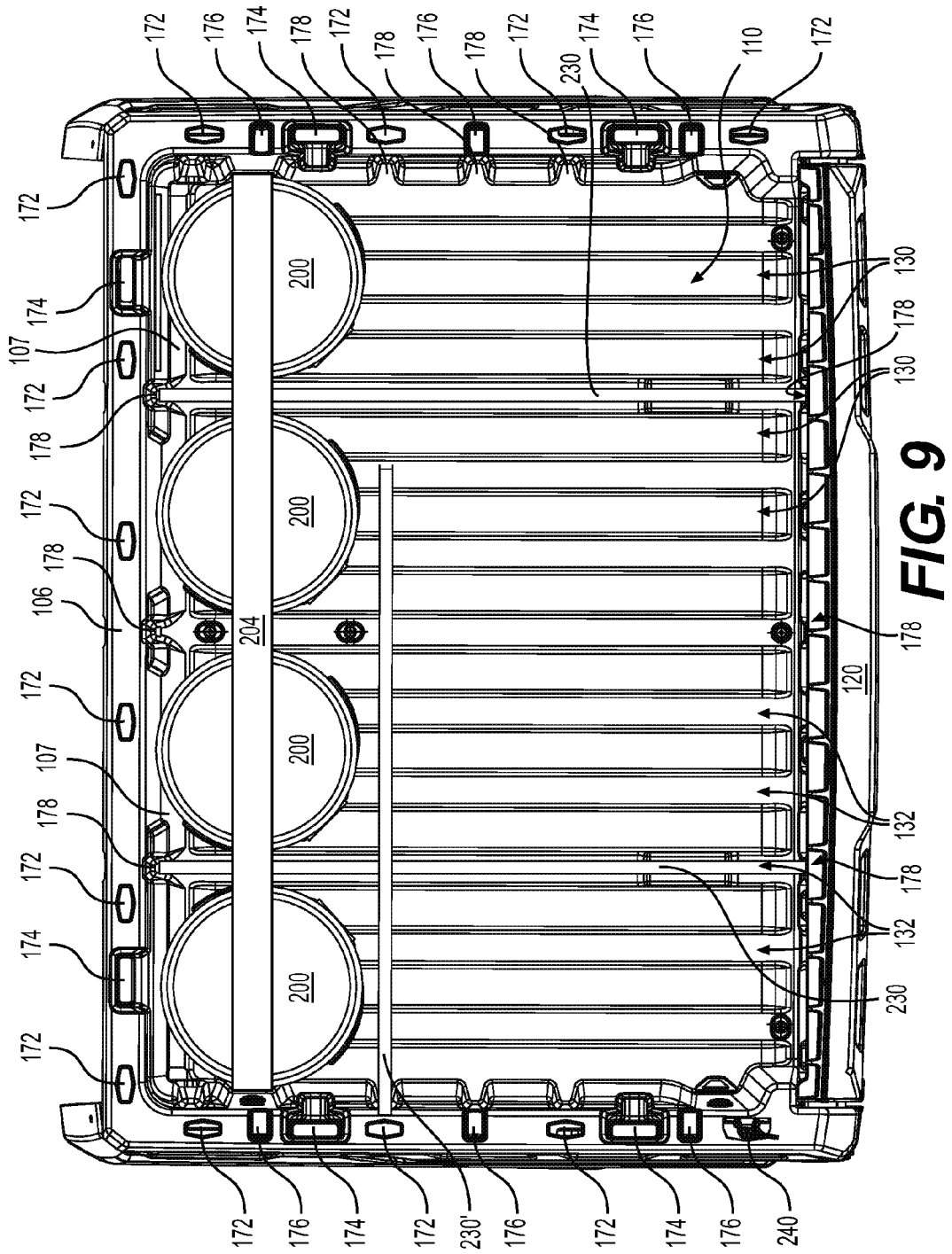
FIG. 9 is a top plan view of the cargo box of FIG. 4, with accessories received therein.
Figure 10:
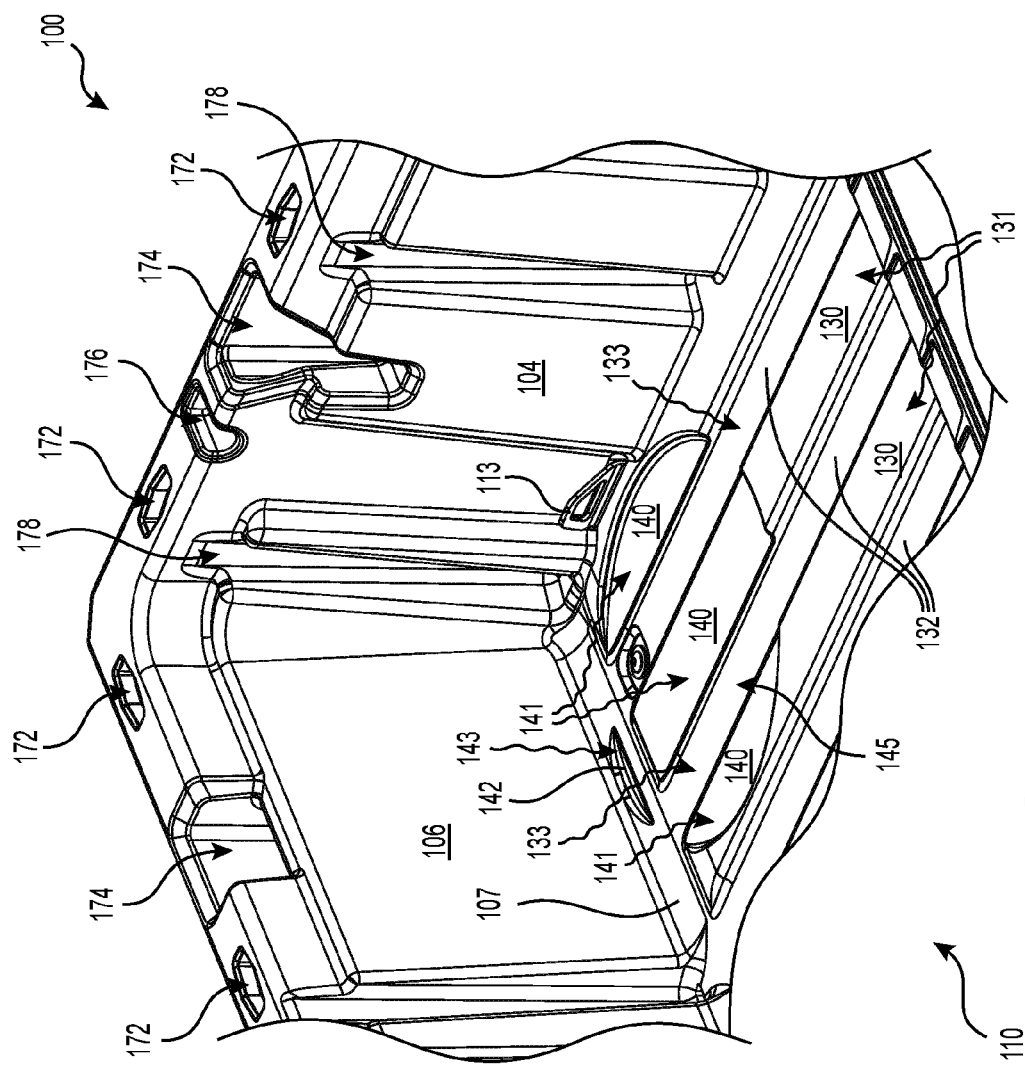
FIG. 10 is a close up perspective view of a front, right corner of the cargo box taken from a rear, left side.
Figure 11:
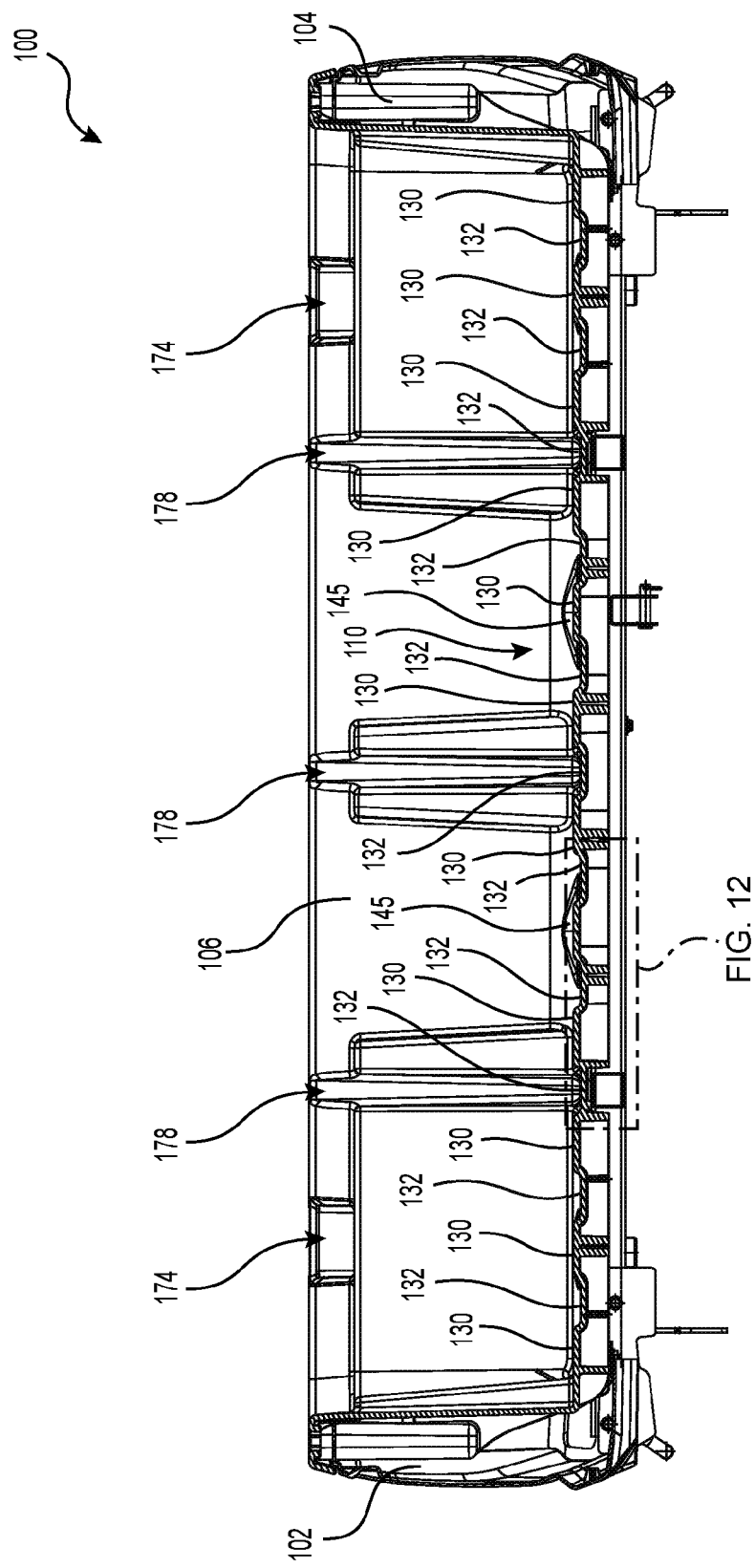
FIG. 11 is a cross-section of the cargo box taken along line 11-11 of FIG. 7.
Figure 12:
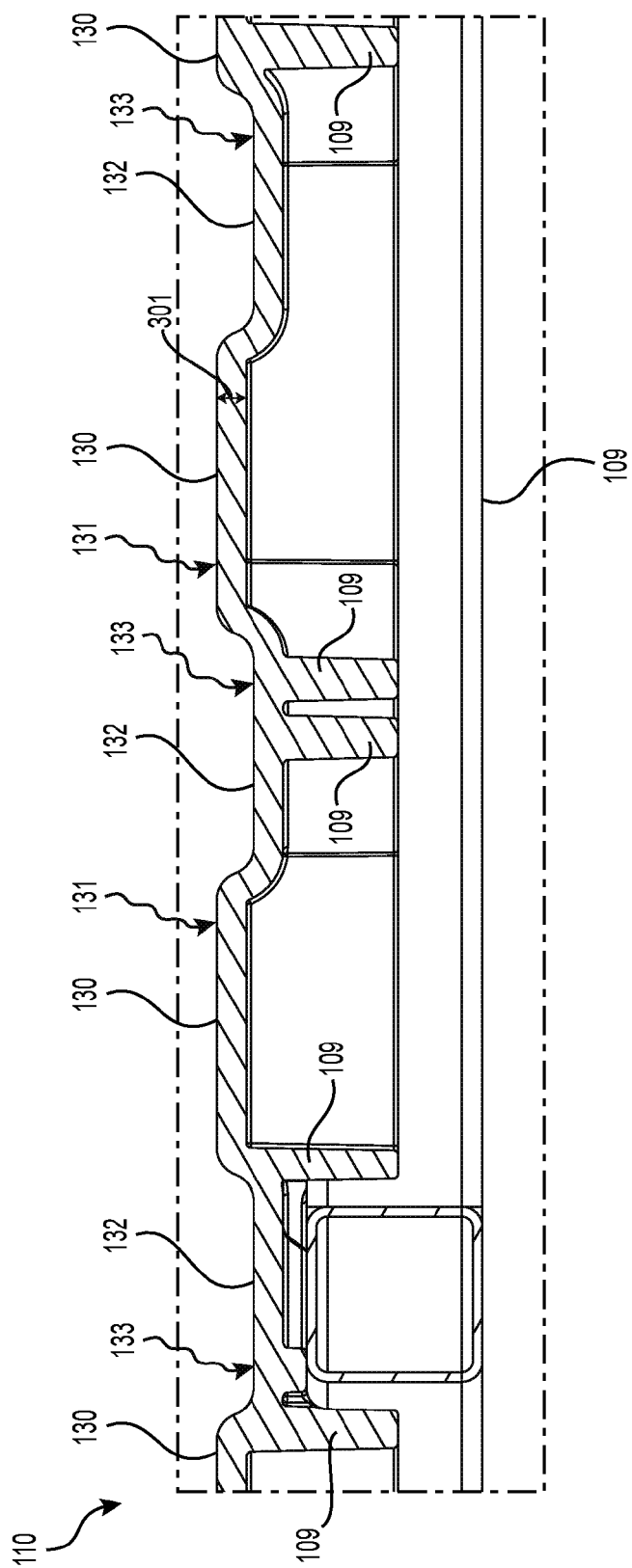
FIG. 12 is a close-up of the portion FIG. 12 of FIG. 11.
Figure 13:
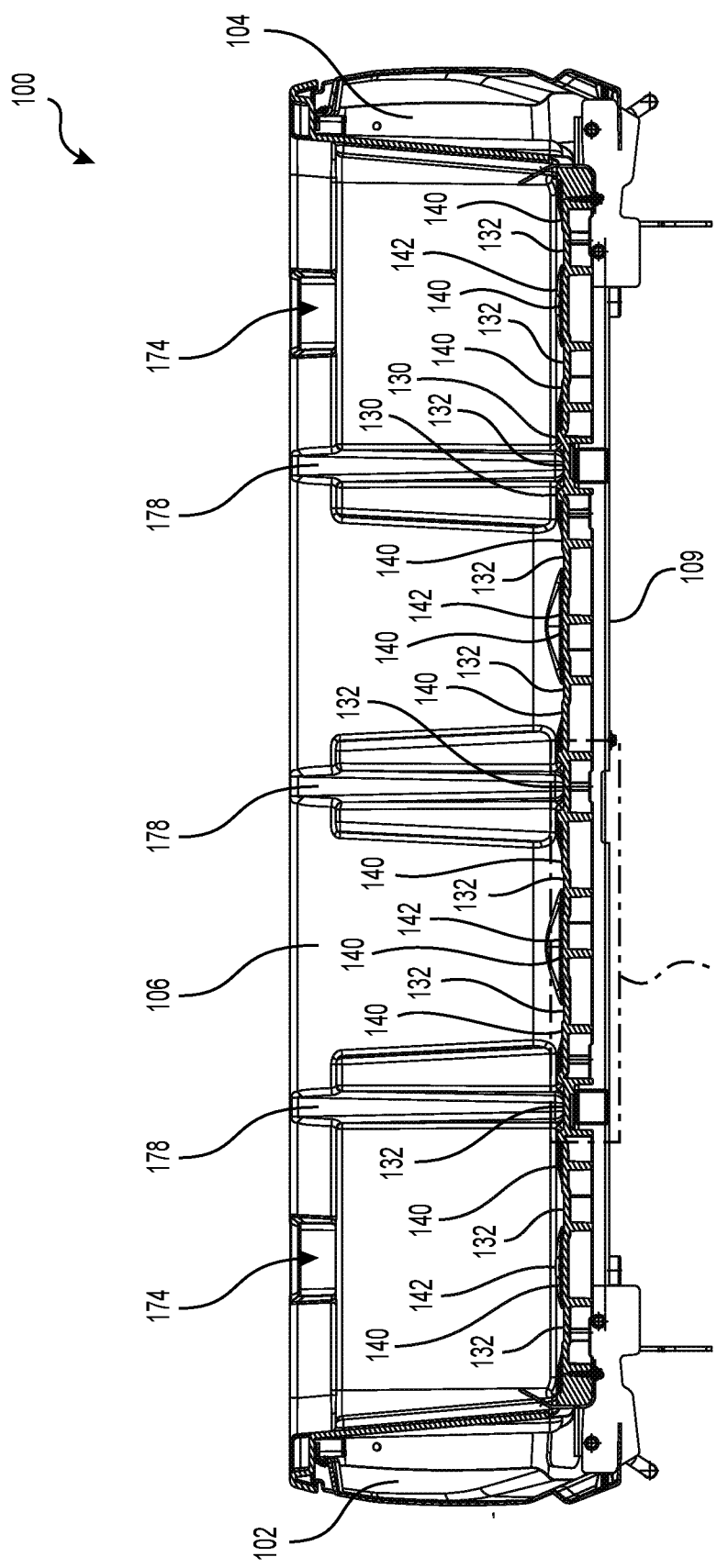
FIG. 13 is a cross-section of the cargo box taken along line 13-13 of FIG. 7.

The left side, right side and front walls 102, 104, 106 include several features for adding or connecting accessories to the cargo box 100. The cargo box 100 of FIG. 4 equipped with some of the accessories described below is illustrated in FIGS. 8 and 9. It is contemplated that the cargo box 100 could include additional accessory-receiving features.

The left side, right side, and front walls 102, 104, 106 each define two support slots 174. The support slots 174 are adapted to selectively receive an accessory bar 210 vertically in the walls 102, 104, or 106. The accessory bar 210 can be, in some implementations, a part of a larger accessory that the user mounts to the cargo box 100. It is contemplated that the support slots 174 could be adapted to receive different objects in the walls 102, 104, 106. It is also contemplated that the cargo box 100 could include more or fewer support slots 174. It is also contemplated that the support slots 174 could be omitted completely in some implementations.

The left and right side walls 102, 104 each also include three horizontal notches 176. The three notches 176 on the left side wall 102 are disposed opposite the three notches 176 on the right side wall 104, such that an accessory bar 220 can be inserted in the notches 176. It is contemplated that more or fewer pairs of horizontal notches 176 could be defined by the cargo box 100. It is also contemplated that the horizontal notches 176 could be omitted in some implementations.

Each of the left and right side walls 102, 104 also each define four oppositely disposed vertical notches 178. The notches 178 are adapted for receiving an accessory wall 230 that spans from the left side wall 102 to the right side wall 104 inside the cargo box 100. The accessory wall 230 could be of any height, although often the accessory wall 230 is tall enough to aid in impeding the buckets 200 from tipping. As is illustrated in FIG. 8, the accessory wall 230 is greater than half the height of the side walls 102, 104. It is contemplated that the accessory wall could be of any size and form, depending on the implementation.

In FIG. 9, an accessory wall 230' is illustrated spanning only a portion of the width of the cargo box 100, where the accessory wall 230' is received by one vertical notch 178 of the left side wall 102. The accessory wall 230' spanning only the portion of the width of the cargo box 100 is supported by the accessory wall 230, perpendicular to the accessory wall 230'. At least a portion of the accessory wall 230' is received in a notch (not shown) in the accessory wall 230, such that the walls 230, 230' are fit together and the accessory wall 230' is impeded from falling. The front wall 106 also defines three vertical notches 178 for receiving accessory walls 230 for spanning all or part of the length of the cargo box, from the front wall 102 to the tailgate 120. It is contemplated that the cargo box 100 could include more or fewer vertical notches 178. It is also contemplated that the cargo box 100 could omit the vertical notches 178 in some implementations.

The left side, right side, and fronts walls 102, 104, 106 further define fourteen accessory apertures 172. The accessory apertures 172 are adapted for receiving accessory anchors 240, such as those described in U.S. Pat. No. 8,777,531, published Jul. 15, 2014, the entirety of which is incorporated herein by reference. It is contemplated that the cargo box 100 could include more or less accessory apertures 172. It is also contemplated that the accessory apertures 172 could be omitted completely in some implementations.

Salient features of the floor 110 will now be described in more detail with reference to FIGS. 10 to 14. It is contemplated that the floor 110 could include additional features beyond those described below in different implementations of the present technology.

The floor 110 includes a repeating distribution of integrally formed ribs 130 and channels 132, supported by a series of integrally formed supports 109 (illustrated in cross-section in FIGS. 12 through 14B). The supports 109 form is criss-crossing pattern on a bottom side of the floor 110, but it is contemplated that the supports 109 could form any number of different patterns. It is also contemplated that the supports 109 could be omitted in some cases.

The channels 132, found between each rib 130, have channel surfaces 133. The ribs 130, as illustrated in cross-section in FIG. 12, have rib surfaces 131 at a rib height 301 above the channel surface 133. As such, items placed on the floor 110 of the cargo box 100 will generally contact only the rib surfaces 131, while liquids that may have spilled in the cargo box 100 will run onto the channel surfaces 133. In this way, liquids are impeded, at least in part, from contacting items placed in the cargo box 100.

The floor 110 also defines four recessed regions 145 for receiving items thereon. Typical items to be received by the recessed regions 145 include, but are not limited to, buckets 200, which are illustrated as received on the recessed regions 145 in FIGS. 8 and 9. The recessed regions 145 help to impede the buckets 200 from sliding on the floor 110 during operation of the vehicle 10. As can be seen in more detail in FIG. 10, the recessed regions 145 have three rib recesses 140 each. Three adjacent ribs 130 each define one rib recess 140 therein. It is contemplated that the recessed regions 145 could each be defined by two rib recesses 140 or more than three rib recesses 140. It is also contemplated that the floor 110 could define more or fewer recessed regions 145.

Each rib recess 140 has a rib recess surface 141 at a recess height 305 (see FIG. 14B) above the channel surfaces 133, such that the channels 132 will still generally receive liquids on the floor 110 of the cargo box 100 below the level of the recess height 305, as described above. Each of the rib recesses 140 of a given recessed region 145 defines a portion of a circle, such that the recessed region 145 generally forms a circle. As such, the bucket 200 can be received on the rib recess surfaces 141. The rib height 301 is greater than the recess height 305, such that a bottom edge of the bucket 200 placed in the recessed region 145 is impeded from sliding along the floor 110. It is contemplated that the rib recesses 140 could define recessed regions 145 of different shapes, including, but not limited to, generally rectangular and generally triangular. It is also contemplated that items with different bottom shapes may be received on the recessed regions 145, as long as the surface of the item placed on the rib recesses 140 is generally circumscribed by the general shape of the recessed region 145.

The front wall 106 includes a radial portion 107 in the region where the front wall 106 meets the floor 110. The front wall 106 also includes four recessed portions 142, in the radial portion 107, that define in part the recessed regions 145. The front wall recessed portions 142 have wall recess surfaces 143, also at the recess height 305. As described above with respect to the rib recesses 140, the wall recessed portions 142 define a portion of a circle, which is aligned with the rib recesses 140 to form different parts of that circle. It is contemplated that the wall recesses 142 could be omitted in some implementations. It is also contemplated that there could be fewer or more than four wall recessed portions 142. It is further contemplated that the wall recess portions 142 could be differently shaped for different shaped recessed regions 145.

The floor 110 further includes two pairs of hooks 113 for attaching straps 204 to the cargo box 100. One pair of hooks 113 is aligned with the recessed regions 145 to be used to secure the buckets 200 placed in the recessed regions 145. By attaching a strap 204 (see FIG. 9) from one of the pair of hooks 113 to the other across the tops of the buckets 200, the strap 204 can help impede the buckets 200 from tipping over. The floor 110 could include more or fewer hooks 113 in different implementations.

As is illustrated in FIGS. 8 and 9, by installing the accessory wall 230 in one or both of the vertical notches 178 just rearward of the recessed regions 145, the recessed regions 145 are disposed between the front wall 106 and the accessory wall 230. This arrangement can help to impede the buckets 200 from tipping over. Specifically, the buckets 200 would hit either the front wall 106 or the accessory wall 230 and are therefore prevented from tipping over.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
at least one seat connected to the frame;
a motor connected to the frame;
a plurality of ground engaging members; and
a cargo box connected to the frame rearward of the at least one seat, the cargo box comprising:
    a floor comprising at least one recessed region, the floor including:
        a plurality of channels, each channel having a channel surface; and
        a plurality of ribs disposed between the plurality of channels,
        each rib having a rib surface at a first height above the channel surfaces,
        at least two adjacent ribs each defining a rib recess, each rib recess having a recess surface at a second height above the channel surfaces, the second height being less than the first height,
        the rib recess surfaces being generally aligned such that an item can be received thereon, the rib recesses of the at least two adjacent ribs forming the at least one recessed region,
        the rib recess surface of at least one rib of the plurality of ribs extending across less than a full width of the at least one rib such that an edge is formed between the rib recess surface of the at least one rib and the rib surface of the at least one rib, the edge being at least partially curved, the edge at least partially impeding horizontal movement of an object received on the rib recess surface;
    a front wall extending upward from the floor, the front wall defining a first vertical notch;
    a first side wall extending upward from a first side of the floor, the first side wall defining a second vertical notch;
    a second side wall extending upward from a second side of the floor, the second side wall being disposed opposite to the first side wall, the second side wall defining a third vertical notch opposite the second vertical notch, the second and third vertical notches being disposed rearward of the at least one recessed region;
    a first accessory wall being selectively received in the first vertical notch; and
    a second accessory wall being selectively received in the second and third vertical notches, the at least one recessed region being disposed:
        between the first accessory wall and at least one of the first and second side walls, when the first accessory wall is received in the first vertical notch, and
        between the front wall and the second accessory wall, when the second accessory wall is received in the second and third vertical notches.

2. A vehicle comprising:
a frame;
at least one seat connected to the frame;
a motor connected to the frame;
a plurality of ground engaging members; and
a cargo box connected to the frame rearward of the at least one seat, the cargo box comprising:
    a floor comprising at least one recessed region;
    a front wall extending upward from the floor, the front wall defining a first vertical notch;
    a first side wall extending upward from a first side of the floor, the first side wall defining a second vertical notch;
    a second side wall extending upward from a second side of the floor, the second side wall being disposed opposite to the first side wall, the second side wall defining a third vertical notch opposite the second vertical notch, the second and third vertical notches being disposed rearward of the at least one recessed region;
    a first accessory wall being selectively received in the first vertical notch; and
    a second accessory wall being selectively received in the second and third vertical notches, the at least one recessed region being disposed:
        between the first accessory wall and at least one of the first and second side walls, when the first accessory wall is received in the first vertical notch, and
        between the front wall and the second accessory wall, when the second accessory wall is received in the second and third vertical notches,
    the floor further including:
        a plurality of channels, each channel having a channel surface; and
        a plurality of ribs disposed between the plurality of channels, each rib having a rib surface at a first height above the channel surfaces, at least two adjacent ribs each defining a rib recess, each rib recess having a recess surface at a second height above the channel surfaces, the second height being less than the first height, the rib recess surfaces being generally aligned such that an item can be received thereon, the rib recesses of the at least two adjacent ribs forming the at least one recessed region; and at least one wall recess being defined by the front wall, the at least one wall recess having a wall recess surface at the second height, the wall recess surface also defining the recessed region.

3. The vehicle of claim 1, wherein:
the rib recesses are first rib recesses having first recess surfaces;
the at least one recessed region is a first recessed region; and
an other at least two adjacent ribs define second rib recesses, each second rib recess having a second recess surface at the second height,
the second rib recess surfaces being generally aligned such that an other item can be received thereon, the second rib recesses defining a second recessed region.

4. The vehicle of claim 1, wherein the at least one recessed region is generally circular.

5. The vehicle of claim 1, wherein the at least one recessed region is four recessed regions disposed between the first side wall and the second side wall.

6. The vehicle of claim 1, wherein the floor further comprises at least one pair of hooks aligned with the at least one recessed region and disposed on either side thereof.

7. The vehicle of claim 1, wherein:
the first side wall defines a first horizontal notch;
the second side wall defines a second horizontal notch disposed opposite the first horizontal notch; and
an accessory bar is selectively received in the first and second horizontal notch.

8. The vehicle of claim 1, wherein:
the first side wall defines a first plurality of horizontal notches;
the second side wall defines a second plurality of horizontal notches disposed opposite the first plurality of horizontal notches; and
a plurality of accessory bars are selectively received in the first and second plurality of horizontal notches.

9. The vehicle of claim 1, wherein:
at least one of the front, first side, and second side walls further defines at least one support slot; and
an accessory bar is selectively received in the at least one support slot.

10. The vehicle of claim 1, wherein:
the first accessory wall has a top edge at a first wall height;
at least one of the front, first side, and second side wall has a top edge at a second wall height; and
the first wall height is greater than half of the second wall height.

11. A vehicle comprising:
a frame;
at least one seat connected to the frame;
a motor connected to the frame;
a plurality of ground engaging members; and
a cargo box connected to the frame rearward of the at least one seat, the cargo box comprising:
a floor comprising at least one recessed region;
a front wall extending upward from the floor, the front wall defining a first vertical notch;
a first side wall extending upward from a first side of the floor, the first side wall defining a second vertical notch;
a second side wall extending upward from a second side of the floor, the second side wall being disposed opposite to the first side wall, the second side wall defining a third vertical notch opposite the second vertical notch, the second and third vertical notches being disposed rearward of the at least one recessed region;
a first accessory wall being selectively received in the first vertical notch; and
a second accessory wall being selectively received in the second and third vertical notches, the at least one recessed region being disposed:
between the first accessory wall and at least one of the first and second side walls, when the first accessory wall is received in the first vertical notch, and
between the front wall and the second accessory wall, when the second accessory wall is received in the second and third vertical notches,
a tailgate defining a fourth vertical notch opposite the first vertical notch,
the first accessory wall being selectively received in the first and fourth vertical notches.

12. The vehicle of claim 11, wherein:
the at least one recessed region is a first recessed region and a second recessed region; and
when the first accessory wall is received in the first and fourth vertical notches, the first accessory wall is laterally between the first recessed region and the second recessed region.

13. The vehicle of claim 12, wherein:
the floor further comprises a third recessed region;
the front wall further defines a fifth vertical notch;
the tailgate further defines a sixth vertical notch; and
when a third accessory wall is selectively received in the fifth and sixth vertical notches, the third accessory wall is laterally between the second recessed region and the third recessed region.

14. The vehicle of claim 1, wherein the cargo box is pivotably mounted to the frame.

15. A vehicle comprising:
a frame;
at least one seat connected to the frame;
a motor connected to the frame;
a plurality of ground engaging members;
a cargo floor connected to the frame rearward of the at least one seat; and
at least one wall extending upward from the cargo floor, the at least one wall and the cargo floor being integrally connected, the at least one wall including a radial portion,
the cargo floor comprising:
a plurality of channels, each channel having a channel surface;
a plurality of raised portions disposed between the plurality of channels, each raised portion having a raised surface at a height above the channel surfaces; and
at least one recessed region being defined by a recess surface, the recess surface of the at least one recessed region being below the raised surfaces, the at least one recessed region being adapted for receiving an item thereon,
the radial portion comprising:

at least one recessed portion being defined by a front recess surface, the front recess surface being vertically aligned with the recess surface of the at least one recessed region.

16. The vehicle of claim 15, wherein the recess surface and the front recess surface form a portion of a circle.

17. The vehicle of claim 15, wherein the at least one recessed region and the at least one recessed portion together form a circular recessed portion.

18. The vehicle of claim 15, wherein the at least one recessed region, as viewed from above, intersects at least a portion of the plurality of channels.

19. The vehicle of claim 15, wherein the at least one recessed region is a pair of laterally oppositely disposed recessed regions.

* * * * *